Fig. 1.

INVENTOR
DANIEL J. McCORMACK
BY
Malcolm F. Gannett
ATTORNEY

Fig. 2.

Dec. 5, 1933.  D. J. McCORMACK  1,937,772

HYDRAULIC TURBINE

Filed Sept. 12, 1931  7 Sheets-Sheet 3

Fig. 3.

INVENTOR
DANIEL J. McCORMACK
BY
Malcolm T. Bannett
ATTORNEY

Patented Dec. 5, 1933

1,937,772

UNITED STATES PATENT OFFICE 1,937,772

HYDRAULIC TURBINE

Daniel J. McCormack, York, Pa., assignor to S. Morgan Smith Company, York, Pa., a corporation of Pennsylvania Application September 12, 1931
Serial No. 562,439

14 Claims. (Cl. 253—143)

This invention relates to improvements in hydraulic turbines of the type wherein the blades of the runner are adjustable to vary their angle and the area of the water opening through the runner to correspond with the angle and opening of the wicket gates or guide vanes which control the admission of water to the runner.

An object of the invention is to provide an improved turbine of the above type in which means are provided by which the operating mechanism for the runner blades is under the control of the wicket gate controlling means, so that when the gates are regulated according to the load, the relative positions of the runner blades will be also correspondingly adjusted and thereby maintain a definite relationship between the angle or position of the gates and the angle or position of the runner blades at all times.

Another object of the invention is to provide an improved turbine of the character mentioned in which novel and effective means are provided for actuating the runner blades to adjust the angle thereof or the areas of the water passages between them while the turbine is in operation.

Another object of the invention is to provide an improved turbine of the above type in which fluid pressure means are utilized for operating the adjusting mechanism of the runner blades.

Another object of the invention is to provide an improved turbine of the above type in which means under the control of the gate regulating governor are provided for controlling the fluid pressure supplied for operating the runner blade adjusting mechanism.

Another object of the invention is to provide an improved turbine of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1:
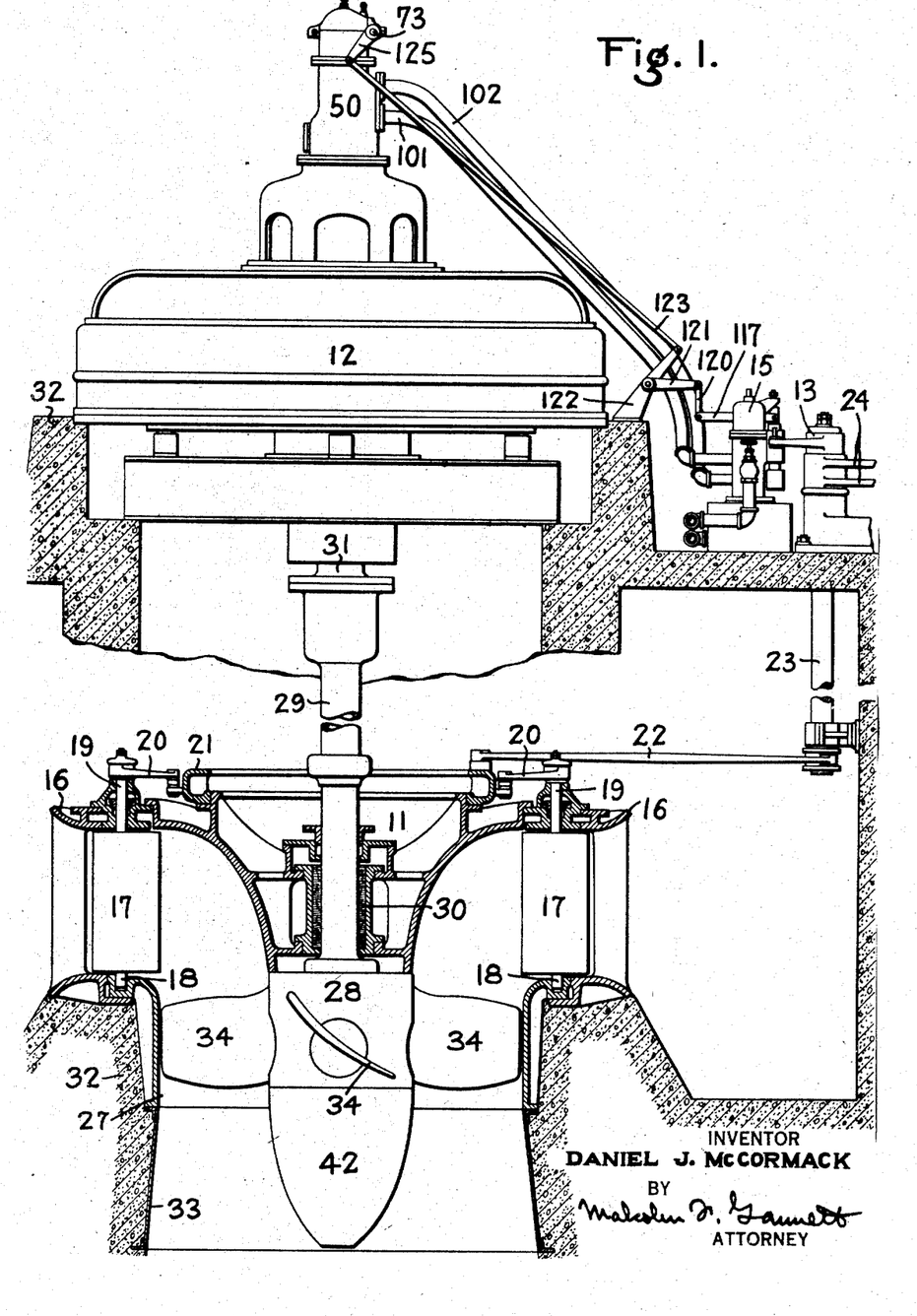
Figure 1 is a side elevation, partly in section, of a turbine employing a runner of the adjustable blade type and embodying controlling means according to the present invention, the main part of the governor being omitted so as to show the control valve device.
Figure 2:
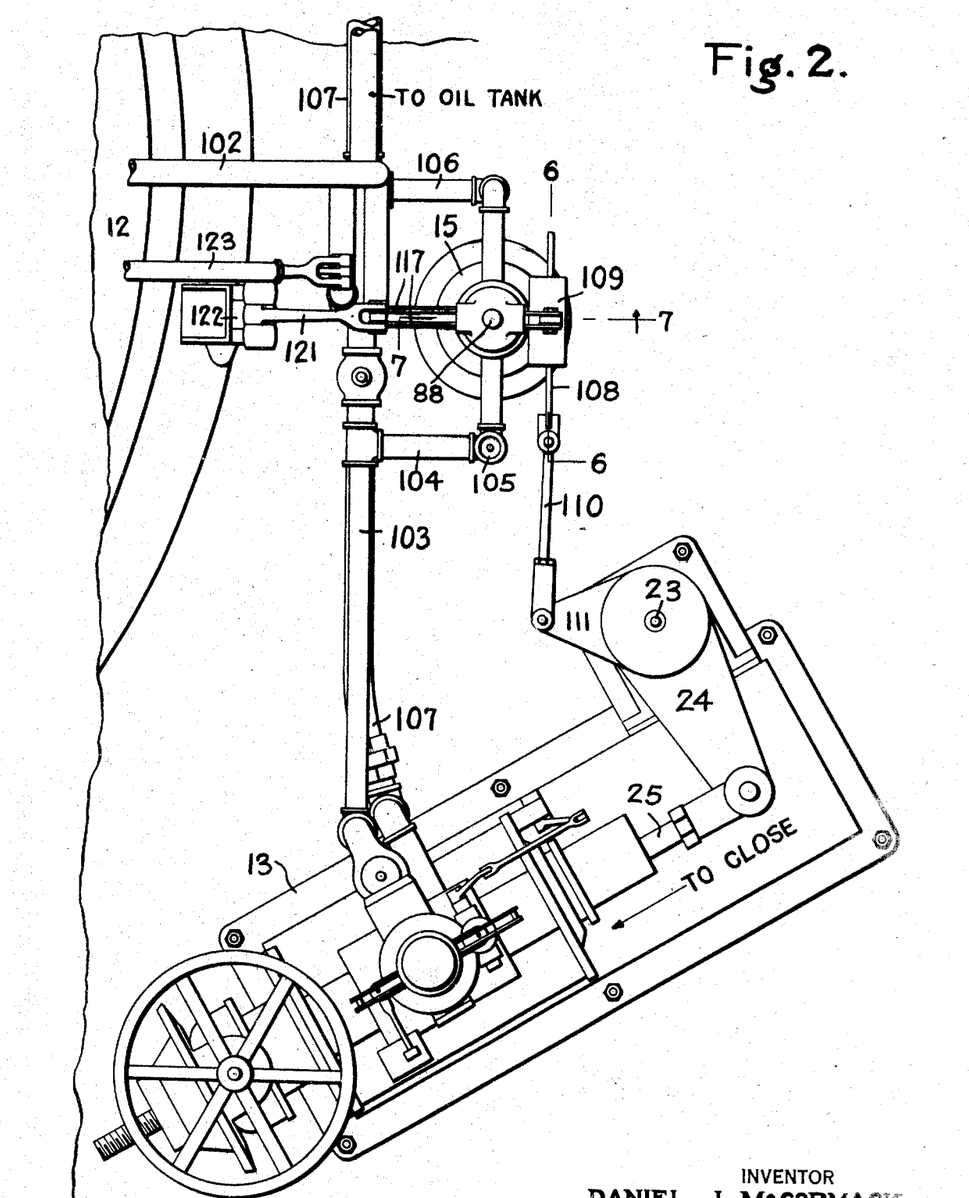
Fig. 2 is a plan of a portion of the structure shown in Fig. 1, showing the governor and control valve device.

Referring to Figs. 1 and 2 of the drawings, the complete generating unit may comprise a hydraulic turbine 11, an electrical generator 12 adapted to be driven by the turbine, and a governor 13.

As is well known in the art, the governor 13 is adapted to automatically control the operation of the turbine, so that the turbine will operate at a substantially uniform speed, irrespective of the variations in the load.

The turbine 11 has a runner which is made with adjustable blades, the angular positions of which are adapted to be varied according to the load, so that the turbine will operate at its highest efficiency at all times. A runner of this type is shown and described in United States Letters Patent No. 1,467,672 granted September 11, 1923 to Victor Kaplan. While in the instant case, the invention is shown applied to a turbine installation of one particular type, it will be understood that the invention is not restricted thereto since the invention is applicable to turbine installations of other types.

In mechanisms falling within the scope of the present invention, the operating fluid is generally oil, and the oil is supplied from the usual pressure tank (not shown) which is installed in the power house as a part of the equipment. The oil pressure tank is connected with the governor 13 and also with the runner blade operating mechanism, means being provided for controlling the oil in such a manner that when the governor operates in either direction to adjust the angles of the wicket gates, the runner blades will be caused to rotate in a similar direction so as to effect a corresponding adjustment in the angles or positions thereof. In this way the parts of the turbine will be simultaneously adjusted so that all of the parts will at all times retain their correct relationship with each other and the turbine will operate with maximum efficiency and smoothness and with minimum vibration.

For the purpose of controlling the actuation of the runner blade operating mechanism, a control valve device 15 is employed. This control valve is connected to the fluid pressure line and is adapted to be operated in the manner to be hereinafter described.

As shown in Fig. 1 the turbine 11 comprises a casing 16 which forms a peripheral water inlet in which are mounted an annular series of wicket gates or guide vanes 17. Projecting from the lower ends of the wicket gates 17, are trunnions 18 which are journalled in the adjacent portion of the casing 16. Likewise, stems 19 project upwardly from the wicket gates 17 and terminate a suitable distance thereabove, said stems being journalled in suitable bearings carried by the casing 16.

The wicket gates 17 are adapted to be rotated simultaneously into different angular positions to control the flow of water into the turbine in the usual manner, and for this purpose the upper ends of the stems 19 are usually provided with gate operating arms 20 which are fixed to said stems and connected by links to a gate adjusting ring 21.

The gate adjusting ring 21 is connected by link means 22 to a shaft 23. Fixed to the upper end of the shaft 23 is an arm 24 which is connected by a link 25 in the well known manner to the controlling member (not shown) of the governor 13 (see Fig. 2).

As shown in Fig. 1 the lower portion of the turbine casing forms an axially directed chamber 27 in which the runner 28 operates.

The hub of the runner 28 is fixed to the lower end of a hollow or tubular shaft 29 which is journalled in a suitable bearing 30 mounted in the turbine casing. The upper end of the runner shaft 29 is directly connected to the shaft 31 of the generator 12 (see also Fig. 4).

Any suitable type of setting may be used for the turbine installation, a concrete setting 32 being shown in the present instance. The portion of the setting below the turbine forms a draft tube 33 into which the water is discharged from the runner. The electrical generator 12 may rest on top of the setting as shown in Fig. 1.

Figure 3:
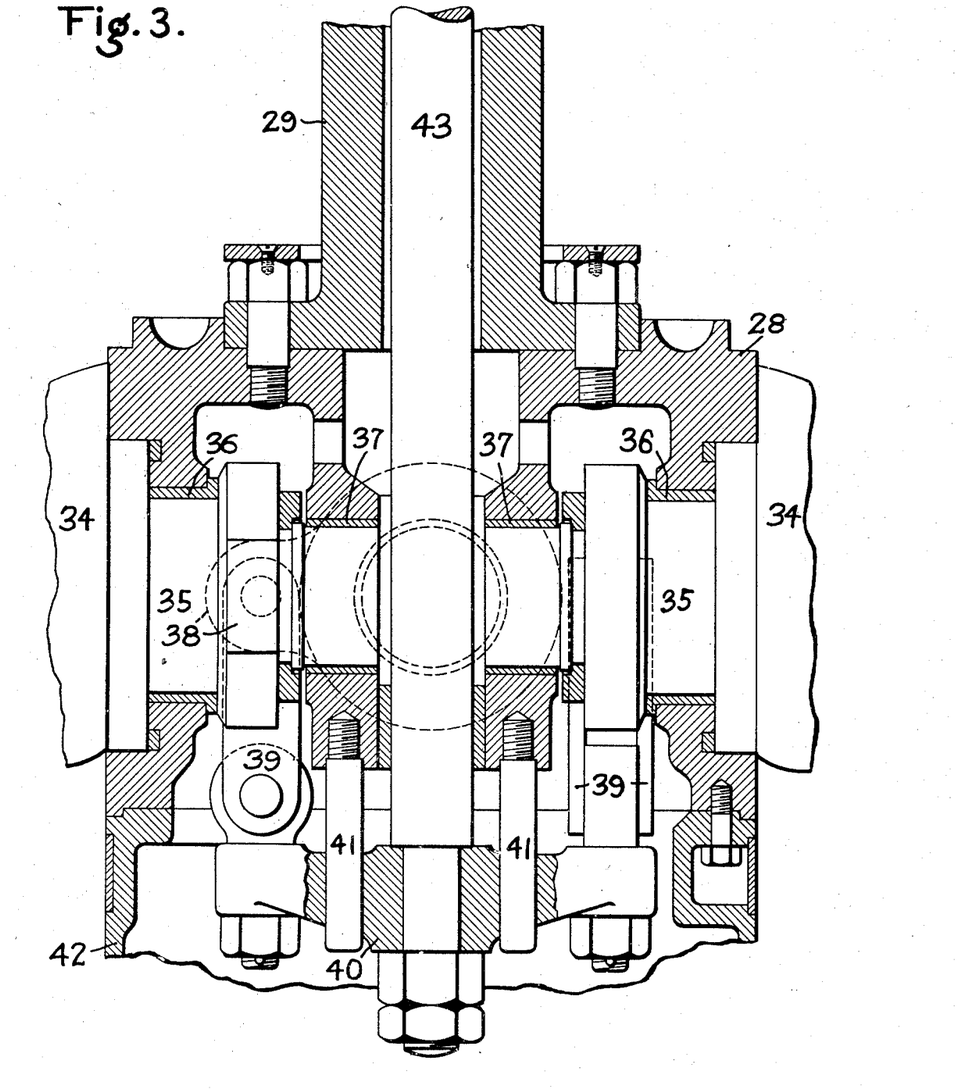
Fig. 3 is an enlarged vertical section of the lower end of the runner and shaft, showing the construction of the parts within the hub of the runners.

Referring now to Fig. 3, the hub of the runner 28 is bolted or otherwise fixed to the lower end of the runner shaft 29.

A suitable number of blades 34 are rotatably supported in the hub of the runner 28 and project radially therefrom. In the present instance four blades are shown (see also Fig. 1).

The inner end of each blade 34 is formed with a trunnion 35 which is journalled in bearings 36 and 37 supported in the hub. The construction is such that the blades are rotatable into different angular relationships with the axis of the runner.

Means are provided for simultaneously rotating all of the blades 34 and for maintaining them in equal angular relationship, such means comprising preferably an arm 38 rigidly fixed on the trunnion 35 of each blade and links 39 which pivotally connect the arms on the different blades to a cross head 40. The cross head 40 is guided to reciprocate in a direction axially of the runner by guide pins 41, which are mounted in the hub of the runner in the manner shown in Fig. 3. It will be understood that the relative positions of the blades 34 govern the area of the water passages or openings between the blades, and that when the blades are rotated, the area of the water passages is increased or decreased depending upon the direction in which the blades are moved.

As shown in Figs. 1 and 3, a cap 42 is bolted or otherwise removably secured to the lower end of the hub of the runner 28. Since the hub of the runner is otherwise enclosed and the hub is hollow, the cap 42 provides a closed chamber or reservoir for containing a supply of grease for lubricating the various working parts of the mechanism contained within the hub of the runner.

The cross head 40 is bolted or otherwise fixed to the lower end of an operating rod 43 which extends upwardly through the hollow runner shaft 29.

Figure 4:
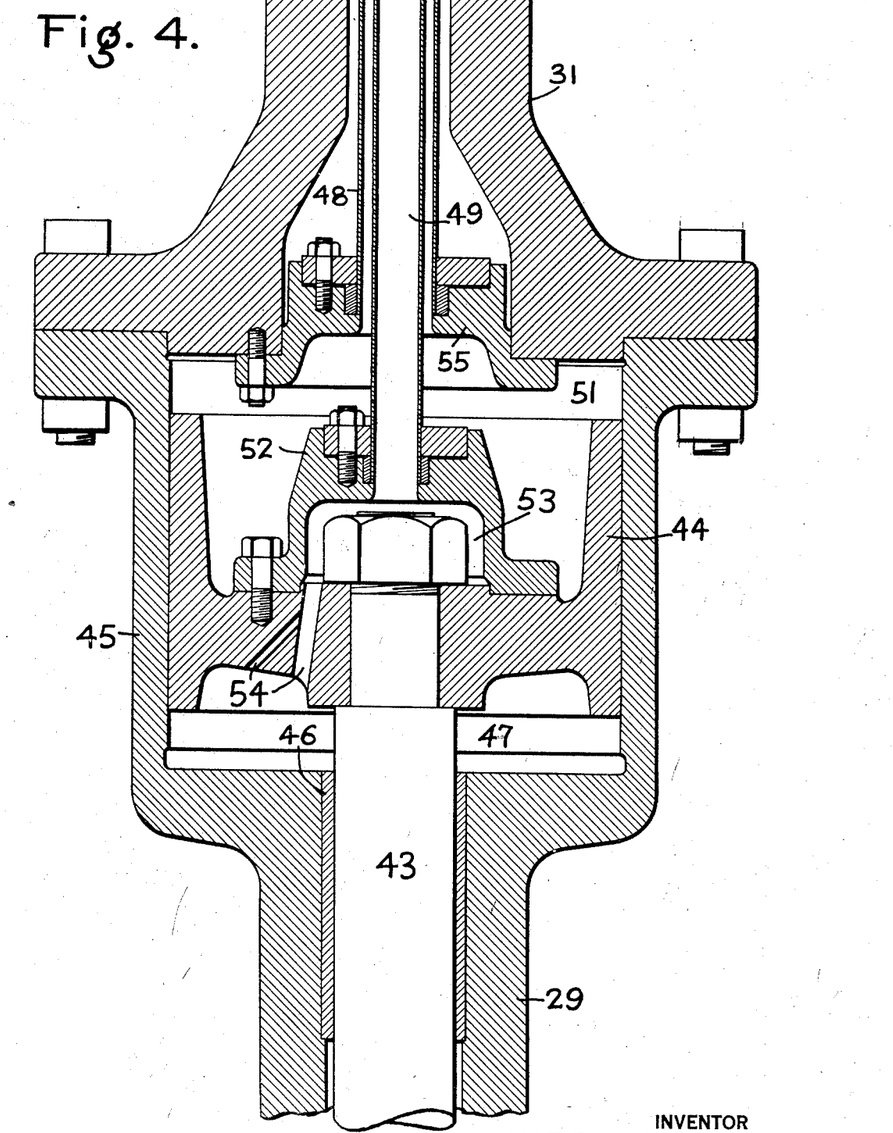
Fig. 4 is an enlarged vertical section of the servo motor associated with the runner blade operating mechanism.

As shown in Fig. 4 the upper end of the operating rod 43 is fixed to the piston 44 of a servo motor 45 which is mounted in the runner shaft 29 adjacent to the point where the runner shaft is joined to the generator shaft 31.

The servo motor piston 44 is contained in a cylinder which may be formed as an enlargement of the runner shaft 29, the upper portion of said cylinder being closed by the lower portion of the generator shaft 31, as shown in Fig. 4.

The upper portion of the operating rod 43 passes through a bushing 46 mounted in the runner shaft 29, and this bushing besides forming a bearing for the operating rod 43, provides means for closing the chamber 47 on the lower side of the piston 44.

Referring now to Fig. 4, the servo motor piston 44 is double acting, and in order to supply oil to both sides thereof for the purpose of operating the same in either direction, two tubes or pipes 48 and 49 are employed. The pipes 48 and 49 are mounted within the hollow generator shaft 31 and rotate therewith, said pipes extending from the servo motor upwardly through the shaft 31 to a head 50 which is mounted on top of the generator 12 (see Figs. 1 and 5). If so desired the pipe 49 can be concentrically disposed within the pipe 48. The lower end of the pipe 49 is in communication with the chamber 47 on the lower side of the servo motor piston 44 and the lower end of the pipe 48 is in communication with chamber 51 on the upper side of said piston.

The lower end of the pipe 49 is fixed to a cap 52 carried by the servo motor piston 44, and therefore the pipe 49 will be moved rectilinearly in the generator shaft 31 when the servo motor operates. A chamber 53 is provided within the cap 52, said chamber being connected to the piston chamber 47 by means of passages or ports 54 formed in the piston 44, so that oil supplied through the pipe 49 will flow into the chamber 47.

The lower end of the pipe 48 terminates above the cap 52, so as to be in communication with the chamber 51 of the servo motor. The lower end of the pipe 48 may be secured to the lower end of the generator shaft 31, by means of a member 55 having a peripheral flange which is bolted or otherwise secured to the adjacent portion of the generator shaft 31. The member 55 provides means for closing the lower end of the hollow generator shaft 31 and thereby cut off communication from the chamber 51 to the space within said shaft exteriorly of the pipes 48 and 49.

Figure 5:
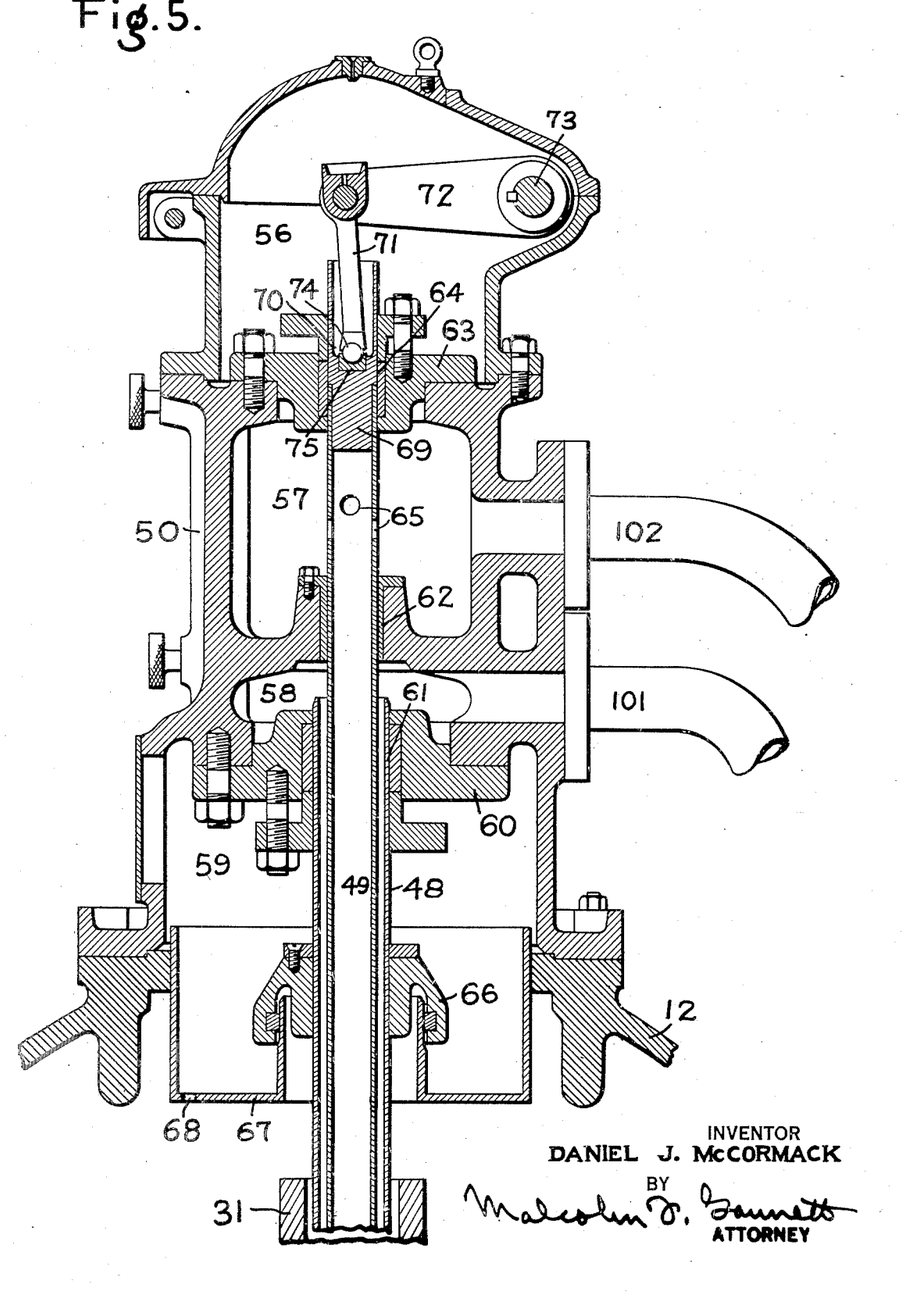
Fig. 5 is an enlarged vertical section of the oil head and associated parts on top of the generator.

Referring now to Fig. 5, the head 50 is formed with a plurality of superposed cavities 56, 57, 58 and 59, the cavities 57 and 58 constituting chambers for containing oil, and the cavities 56 and 59 forming housings for the mechanism.

The upper end of the pipe 48 terminates within the chamber 58 so that said chamber is at all times in communication with the servo motor chamber 51. For the purpose of securing the upper end of the pipe 48 in position, a member 60 is employed. This member has a peripheral flange which is bolted or otherwise secured to the adjacent portion of the body of the head 50. In order to prevent leakage of oil from the chamber 58 into the cavity 59, a packing gland 61 is fitted to the member 60 and surrounds the pipe 48.

The pipe 49 projects upwardly through the chambers 58 and 57, and terminates in the cavity 56. For the purpose of guiding the pipe 49, a bearing 62 is fitted in the wall separating the chambers 57 and 58. Since the bearing 62 snugly fits around the pipe 49, leakage of oil between the chambers 57 and 58 is reduced to a minimum.

The top of the chamber 57 is closed by means of a cap plate 63 which is detachably secured to the head 50 by means of bolts or other suitable fastening means. A packing gland 64 is secured to the cap plate 63 and surrounds the upper portion of the pipe 49 so as to seal the top of the chamber 57.

A plurality of openings 65 are formed in the portion of the pipe 49 which is located within the chamber 57, so that oil can flow from said chamber into the pipe and from thence downwardly to the chamber 47.

At a convenient point in the cavity 59 the pipe 48 has fixed thereto a sealing ring 66. This sealing ring is associated with a pan 67 carried by the upper portion of the generator 12 in such a manner that any oil seeping through the packing gland 61 will be prevented from passing down the exterior of the pipe 48 to the upper end of the generator shaft 31. In order to prevent oil from accumulating in the pan 67, the bottom of the pan is perforated, as at 68 (Fig. 5), near the outer edge thereof, so that the oil will pass to the outside of the upper end of the generator shaft 31.

The upper end of the pipe 49 is closed by a plug 69. The plug projects upwardly into the cavity 56. The upper portion of the plug 69 is hollowed out to form a recess 70.

Mounted on a shaft 73 which is transversely disposed in the upper portion of the head 50, is a lever 72, and depending from said lever is an arm 71 which extends into the recess 70 in the plug 69. A ball 74 is interposed between the end of the arm 71 and a bearing block 75 in the bottom of the recess 70. The construction and arrangement of these parts is such that vertical movement of the pipe 49 in either direction is transmitted through the arm 71 and lever 72 to the shaft 73, with the result that the shaft will be rotated in either direction. It will also be understood that due to the provision of the ball 74, a universal joint is formed between the pipe 49 and arm 71, so that the pipe 49 will be free to rotate with respect to the non-rotating arm 71, during the operation of the turbine.

Figure 6:
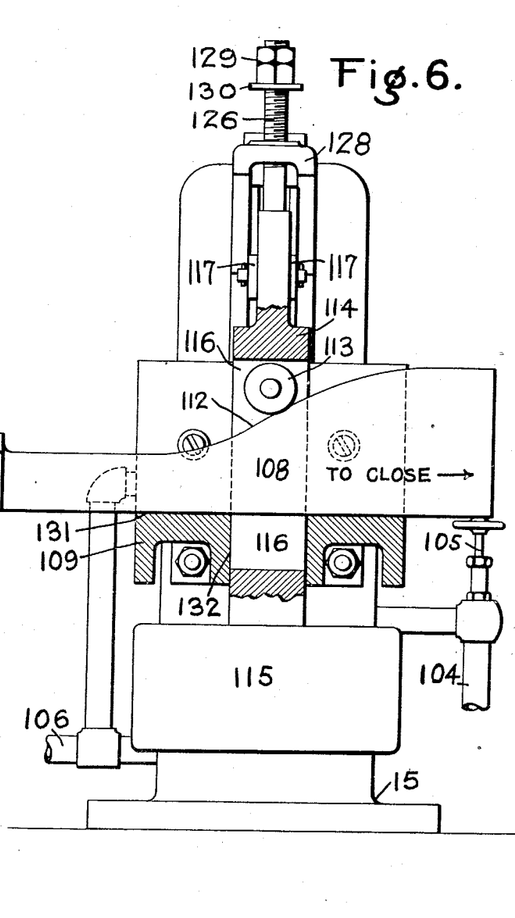
Fig. 6 is an elevation, partly in section, of the control device as seen from the line 6—6 Fig. 2.
Figure 7:
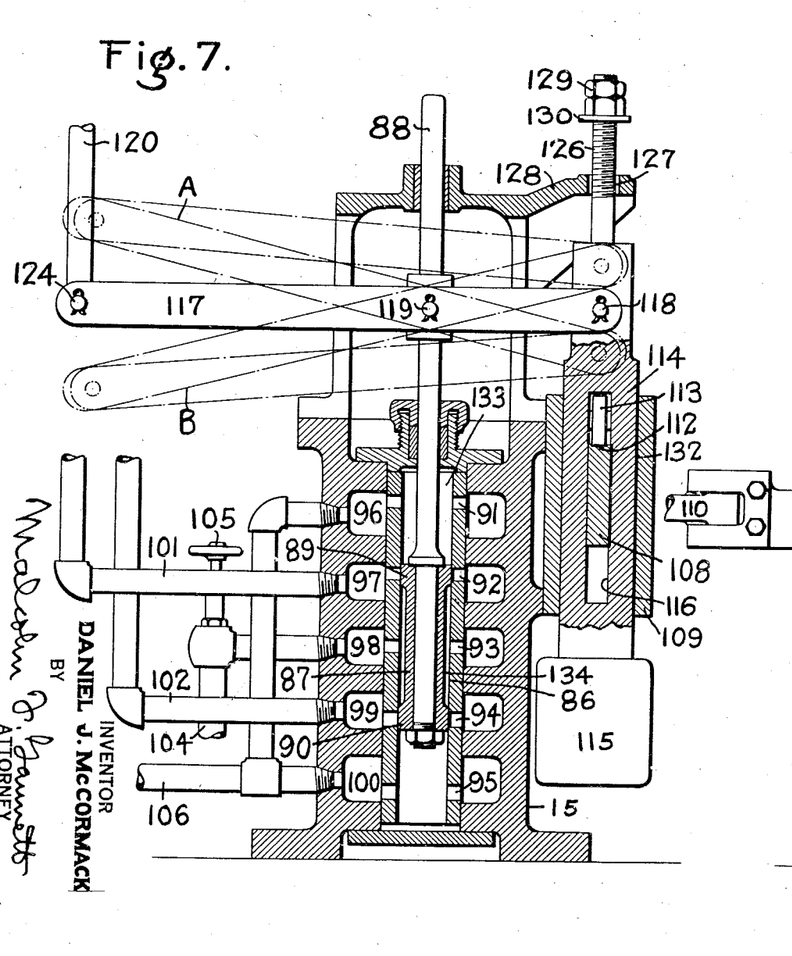
Fig. 7 is a diagrammatic section of the control valve device, taken on the line 7—7 of Fig. 2.

Referring now to Figs. 6 and 7, the control valve device 15 comprises a casing formed with a cylinder 86. Contained in the cylinder 86 is a valve 87. As shown, the cylinder and valve may be vertically disposed, and the valve has a stem 88 which projects upwardly through the top of the casing of the valve device 15.

A plurality of ports 91, 92, 93, 94, and 95 are provided for connecting the cylinder 86 with a plurality of chambers 96, 97, 98 and 99 and 100 respectively. The valve 87 is formed with a pair of spaced apart and connected heads 89 and 90. The ports 92 and 94 are spaced apart a suitable distance, so that the heads 89 and 90 will lap said ports when the valve 87 is in one position, as will be hereinafter described, and all of the ports are so disposed relatively to each other, that when the valve 87 is in certain other positions said ports will be connected in the manner to be hereinafter described.

Chamber 97 is connected by a pipe 101, with the chamber 58 in the head 50, and a pipe 102 connects chambers 99 and 57 (see Figs. 5 and 7). The chamber 98 is connected to the oil pressure conduit 103, by a pipe 104, which is fitted with a manually operated valve 105 (see Figs. 2 and 7).

Chambers 96 and 100 are connected by a pipe 106 to the return conduit 107 which connects the governor 13 with the sump tank (not shown) of the oil pressure system (see Figs. 2 and 7).

For the purpose of operating the valve 87, a cam 108 is provided. This cam comprises an elongated body which is mounted for horizontal movement in a slot 131 formed in a saddle 109. The saddle 109 is bolted or otherwise attached to the side of the casing of the control valve device 15, as shown in Figs. 6 and 7.

One end of the cam 108 is connected by a link 110, to an arm 111 fixed to and projecting from the gate operating shaft 23, so that rotation of the shaft 23 resulting from the operation of the governor 13, results in the cam being moved rectilinearly in the saddle 109 (see Fig. 2).

As shown in Fig. 6, the upper surface of the cam 108 is formed with a cam face 112 which is adapted to engage a roller 113, carried by a vertically movable plunger 114. The plunger is mounted in a bore 132 formed in the saddle 109.

The upper end of the plunger 114 is formed with a threaded portion 126 which passes through an opening 127 formed in a bracket 128. Above the bracket 128, the threaded portion 126 has nuts 129 and a washer 130 mounted thereon so as to provide means for manually raising the plunger 114, should it be so desired.

The bottom of the plunger 114 is formed with an enlarged portion 115, which constitutes a weight for maintaining the roller 113 in contact with the cam face.

A pair of bars 117, which are arranged in parallel relation on opposite sides of the valve stem 88 and plunger 114, have one end pivotally connected, as at 118, to the plunger 114, their intermediate portion pivoted to the valve stem 88, as indicated at 119, and their other end connected by a link 120, to one arm of a bell crank lever 121, the link 120 being connected to the bars 117 by means of a pivot pin 124. The bars 117 constitute a floating lever, the purpose of which will be hereinafter described.

The bell crank lever 121 is supported by a bracket 122 mounted on the base of the apparatus, as shown in Figs. 1 and 2. The other arm of the lever 121 is connected by a rod 123 to an arm 125 fixed to the shaft 73.

It will be understood that when the parts are operatively assembled and the chambers 51 and 47 are charged with oil under pressure, the weight of the parts connecting the floating lever 117 and the arm 125 will pull the lever 72 downwardly, thereby maintaining the free end of the arm 71 in engagement with the ball 74, so that any movement of the pipe 49 will be transmitted through the levers and links hereinbefore described to the floating lever 117.

In operation, when the governor 13 operates to swing the wicket gates 17 toward open or closed position to vary the gate opening to conform with variations in the load on the turbine, the rotation of the shaft 23 in either direction will effect a corresponding movement of the valve 87 of the control valve device 15, since said valve is connected to the governor through the floating lever 117, plunger 114, cam 108, link 110, and arm 111, and the servo-motor 45 will be supplied with fluid under pressure so as to operate the runner blade operating mechanism toward open or closed position.

In the illustrated embodiment of the invention, the runner blades 34 are shown approximately one-half opened and the governor and wicket gates are shown correspondingly positioned. With the runner blades 34 opened approximately one-half, the cam 108 of the control valve device 15 is so positioned that the roller 113 engages the cam face 112 at a point approximately equidistant from the highest and lowest points thereof, so that the plunger 114 is maintained correspondingly positioned within the frame provided by the saddle 109.

When the governor 13 and control valve device 15 are inactive, the valve 87 is so positioned in the cylinder 86, that the valve heads 89 and 90 lap the ports 92 and 94, respectively. With the valve 87 in this position, communication is cut off between the cylinder 86 and the chambers 97 and 99, respectively, and oil under pressure is retained or bottled up, in the chambers 57 and 58, the pipes 48 and 49, and the chambers 51 and 47, respectively, so that the servo motor piston 44 remains in a position corresponding to the position of the runner blades 34. The parts will remain so positioned until the governor 13 operates, in response to a variation in load, to shift the wicket gates 34.

As shown by the arrow in Fig. 2, the governor 13 moves toward the left to close the wicket gates and toward the right to open said gates.

The cam 108 is connected to the gate shaft 23 in such a manner that movement of the governor 13 in one direction, causes the cam to move in the opposite direction. That is to say, when the governor moves toward the left (Fig. 2), the cam 108 is moved toward the right (Fig. 6) and vice versa, when the governor moves toward the right, the cam 108 moves toward the left.

Should the load on the turbine decrease, the governor 13 will act to move the wicket gates 17 toward closed position, so as to decrease the quantity of the driving fluid supplied to operate the runner 28.

The movement of the governor toward the left causes a corresponding movement of the cam 108 toward the right, with the result that the plunger 114 moves downwardly. The downward movement of the plunger 114 is effective through the floating lever 117, and said lever is swung downwardly on the fulcrum provided by the pivot pin 124, and this action causes a downward movement of the valve 87, so that the valve heads 89 and 90 uncover the ports 92 and 94, respectively.

When the valve 87 moves downwardly and port 92 is uncovered, chamber 97 is connected to chamber 96, through port 92, chamber 133, and port 91, and fluid under pressure is vented from the servo motor chamber 51 to the return conduit 107, through pipe 48, chamber 58, pipe 101, chamber 97, port 92, chamber 133, port 91, chamber 96 and pipe 106.

Simultaneously with the venting of fluid under pressure from the chamber 51, fluid under pressure is supplied to the chamber 47 of the servo motor 45, from the supply pipe 103, through pipe 104, chamber 98, port 93, valve chamber 134, port 94, chamber 99, pipe 102, chamber 57, and pipe 49.

The fluid under pressure thus supplied to the chamber 47 acts on the underside of the servo motor piston 44 and forces said piston upwardly. This upward movement of the piston 44 is transmitted by the rod 43 to the cross head 40, and said cross head acting through the links 39 and arms 38, will simultaneously rotate the runner blades about their trunnions as axes, toward closed position.

Since the shaft 73 is connected to the servo motor piston 44 by means of the lever 72, arm 71, and the pipe 49, said shaft will be rotated in a clockwise direction as soon as the servo motor piston 44 commences to move upwardly to effect a change in the angle or position of the runner blades.

The rotation of the shaft 73 is transmitted by the arm 125, rod 123, bell crank 121 and link 120, to the left hand end of the floating lever 117 (Fig. 7), and said lever will accordingly be swung upwardly about the fulcrum provided by the pivot pin 118.

In this action of the floating lever 117, the valve 87 will be raised slightly, thereby moving the valve 87 toward lap position. However, the upward movement of the valve 87 is counteracted by the continued downward movement of the plunger 114, so that while the left end of the lever 117 is gradually raised, the right end of said lever will be gradually lowered. In this way the valve 87 will be maintained in the position in which the ports 92 and 94 are respectively uncovered by the valve heads 89 and 90 an amount sufficient to establish communication in the above described manner to both sides of the servo motor piston 44.

The movement of the right end of the floating lever 117 is definitely limited by the governor 13, but the opposite or left end of said lever will continue to move as long as the ports 92 and 94 are not lapped by the heads 89 and 90, respectively, of the valve 87. Therefore, the left end of the floating lever 117 will continue its upward motion until the ports 92 and 94 are lapped, thereby cutting off the communication through which fluid under pressure is supplied to operate the servo motor 45.

The action of the governor 13 will continue until the wicket gates have been closed an amount sufficient to cause an overload on the turbine, whereupon the governor reverses and moves the wicket gates toward open position, thereby gradually relieving the load on the turbine.

Since the rotation of the runner blades as effected by the servo motor 45, is not simultaneous with the action of the governor 13, but closely follows the same, the upward movement of the plunger 114 resulting from the reversed action of the governor, taken in connection with the movement of the servo motor piston 44, will, through the action of the floating lever 117, cause the valve 87 to move to the position in which the ports 92 and 94 are lapped. In this way the communication through which fluid under pressure is supplied to operate the servo motor piston 44 is cut off and the operation of the servo motor is interrupted. The runner blades will then have been brought to an angle or position corresponding with the adjusted position into which the wicket gates have been brought by the governor 13.

The parts will then remain so positioned relative to each other until the wicket gates are again operated, whereupon a runner blade adjusting operation similar to that just described will again take place to automatically move the runner blades into proper position with respect to the position assumed by the wicket gates.

However, when the load is increased, the governor 13 will move in the direction opposite to that shown by the arrow in Fig. 2 and the operation of the other parts will be reversed to that heretofore described. In this connection it will be noted that the valve 87 moves upwardly in the cylinder 86, so that when the port 94 is uncovered, chambers 99 and 100 will be connected, and chambers 97 and 98 will be connected. Fluid under pressure will then be vented from the servo motor piston chamber 47 and fluid under pressure will be supplied to the servo motor piston chamber 51, so that the piston 44 will be moved downwardly.

The extreme positions of the floating lever 117 are shown by broken lines in Fig. 7. When the runner blade adjusting mechanism is inactive and the runner blades are approximately one-half opened, the floating lever 117 will be in an approximately horizontal position, as shown. When the runner blades are closed, the floating lever 117 will be in the position shown by the broken lines indicated at A (Fig. 7), and when the runner blades are opened wide, the floating lever will be in the position shown by the broken lines indicated at B (Fig. 7).

The present invention as hereinbefore described provides novel and improved means whereby the adjustable runner blades of a hydraulic turbine may be opened or closed to conform with the opening or closing of the wicket gates by the usual governor to maintain the speed of the turbine constant under increases or decreases in the load, so that the runner blades may always occupy an angle or position which corresponds with a definite position of the wicket gates as determined by the output of the turbine.

The simultaneous adjusting of the runner blades and the wicket gates results in obtaining exceptionally high part load efficiencies, thus securing very flat efficiency load curves.

Figure 8:
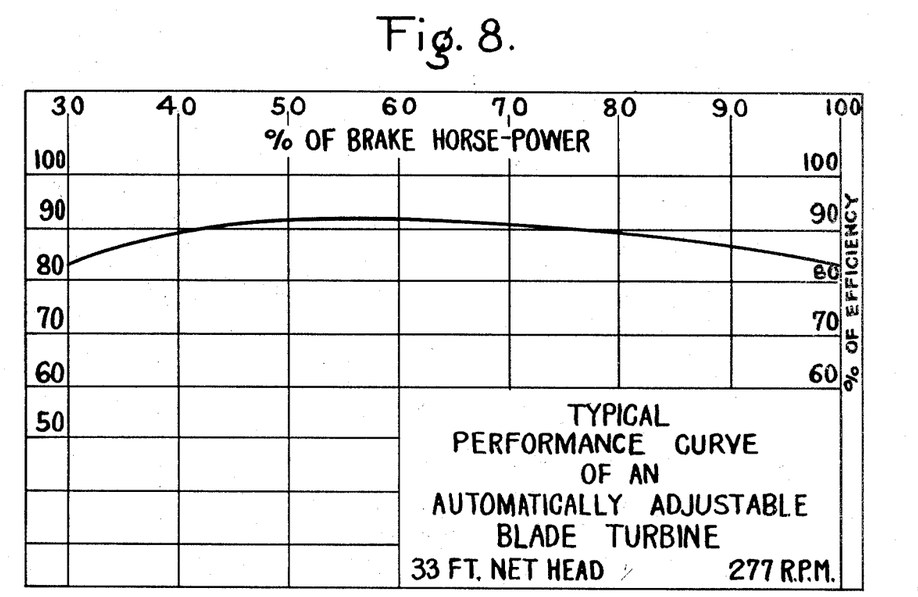
Figs. 8 and 9 are diagrams illustrating typical efficiency load curves of a turbine constructed according to the present invention.

As shown in Fig. 8, it will be noted that the curve is very flat and that the runner has an efficiency of more than 85 per cent from 33 to 96 per cent load and more than 90 per cent efficiency from 43 to 75 per cent load.

Figure 9:
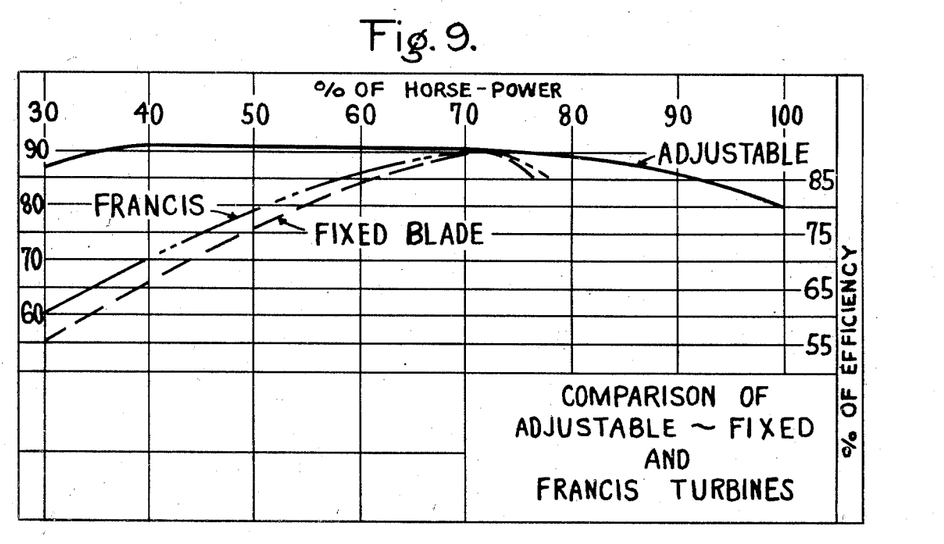

Fig. 9 shows the advantage in efficiency of an adjustable blade turbine at all loads as compared with the fixed blade and Francis turbines. As shown, the fixed blade and Francis turbines attain high efficiencies only at nearly full load and the part load efficiencies drop off very sharply.

While one illustrative embodiment of the invention has been described in detail, it is not my intention to limit its scope to that embodiment or otherwise than by the terms of the appended claims.

Having thus described my invention what I claim as new and desire to secure by Letters Patent is:—

1. The combination with a runner having blades movable into different angular positions, and gates movable into different angular positions and controlling the flow of the driving fluid to the runner, of a governor for adjusting the angular positions of the gates, fluid pressure operated reciprocatory mechanism for moving the runner blades in either direction, a valve device under the control of the governor for controlling the fluid supplied to said reciprocatory mechanism, a floating lever operatively connected with said valve device, a rod operatively connected with said reciprocatory mechanism and movable therewith, a rock shaft, links connecting said rock shaft with the floating lever, and leverage means connected to said rock shaft and having a universal joint connected with said rod.

2. The combination with a runner having blades movable into different angular positions, and gates movable into different angular positions and controlling the flow of the driving fluid to the runner, of a governor for adjusting the angular positions of the gates, fluid pressure operated means for adjusting the positions of the runner blades, and means for maintaining the relative positions of the runner blades in synchronization with the gates, comprising a valve device for controlling the supply of fluid under pressure to said runner blade adjusting means, a cam operated by the governor for actuating said valve device, a floating lever also connected to said valve device for operating the same, and means connecting said floating lever with said runner blade adjusting means.

3. The combination with a runner having blades movable into different angular positions, of gates movable into different angular positions and controlling the flow of the driving fluid to the runner, a governor for adjusting the angular positions of the gates, mechanism for moving the runner blades, a fluid pressure operated reciprocatory member for operating said mechanism in either direction, a valve device for controlling the fluid supplied to said reciprocatory member, means operatively associated with the governor for operating said valve device, a floating lever operatively connected with said valve device, a rod operatively connected with said reciprocatory member and movable therewith, a rock shaft, links connecting the rock shaft with the floating lever, a lever carried by said shaft, an arm connected to said lever, and a universal joint connection between said rod and said arm.

4. The combination with a runner having blades movable into different angular positions, of gates movable into different angular positions and controlling the flow of the driving fluid to the runner, a governor for adjusting the angular positions of the gates, mechanism for moving the runner blades, a fluid pressure operated reciprocatory member for operating said mechanism in either direction, a valve device for controlling the fluid supplied to said reciprocatory member, a cam operatively associated with the governor for operating said valve device, a floating lever operatively connected with said valve device, a rod operatively connected with said reciprocatory member and movable therewith, a rock shaft, links connecting the rock shaft with the floating lever, a lever carried by said rock shaft, and an arm operatively connected to said last named lever and said rod.

5. In combination, a runner having movable blades, movable gates for controlling the quantity of driving fluid to the runner, means for varying the positions of the gates, fluid pressure operated means for moving the runner blades, a valve device for controlling the supply of fluid under pressure to said fluid pressure operated means, a cam operated by said gate positioning means for operating said valve device, means operatively connected with said runner blade operating means and movable therewith, and means connecting the last named means and said valve device for also operating said valve device.

6. In combination, a runner having movable blades, movable gates for controlling the quantity of driving fluid to the runner, means for varying the positions of the gates, fluid pressure operated means for moving the runner blades, a valve device for controlling the supply of fluid under pressure to said fluid pressure operated means, a cam operated by said gate positioning means for operating said valve device, means operatively connected with said runner blade operating means and movable therewith, and means connecting the last named means and said valve device for also operating said valve device independently of said cam.

7. In combination, a runner having movable blades, a hollow shaft connected to said runner, gates movable into different angular positions and controlling the flow of the driving fluid to the runner, means responsive to variations in the load on the runner for varying the positions of the gates in accordance with variations in the load, means mounted in the runner shaft and movable rectilinearly therein for adjusting the positions of the runner blades, a control device, means operatively connecting said control device with said gate adjusting means, means movable with the blade adjusting means and extending through the upper end of the runner shaft, and means operatively connecting said last named means with said control device for also controlling the operation of said control device whereby the runner blades are maintained correspondingly positioned relative to said gates.

8. In combination, a runner having movable blades, a hollow shaft connected to the hub of said runner, gates movable into different angular positions and controlling the flow of the driving fluid to the runner, means responsive to variations in the load on the runner for varying the positions of the gates in accordance with variations in the load, a servo motor mounted in the runner shaft and movable rectilinearly therein for adjusting the positions of the runner blades, a valve device for controlling the operation of said servo motor, a rod connected to the servo motor and extending toward the outer end of the runner shaft, means operatively connecting the valve device with said rod, and means operatively connecting said valve device with the gate adjusting means.

9. In combination, a runner having movable blades, a hollow shaft connected to the hub of said runner, mechanism within the hub of the runner for actuating the runner blades, a movable abutment within the runner shaft for operating said mechanism, gates movable into different angular positions and controlling the flow of the driving fluid to the runner, a governor responsive to variations in the load on the runner for varying the positions of the gates in accordance with variations in the load, means for supplying fluid under pressure to the opposite sides of said abutment, a valve device for controlling the fluid in said fluid supplying means, a rod connected to the movable abutment and extending towards the outer end of the runner shaft, and leverage mechanism operatively connecting the rod with said valve device.

10. In combination, a runner having movable blades, a hollow shaft connected to the hub of said runner, mechanism within the hub of the runner for actuating the runner blades, a servo motor within the runner shaft for operating said mechanism, gates movable into different angular positions and controlling the flow of the driving fluid to the runner, a governor responsive to variations in the load on the runner for varying the positions of the gates in accordance with variations in the load, means for supplying fluid under pressure to the opposite sides of said servo motor, a valve device for controlling the fluid supplied to said servo motor, leverage mechanism connecting the servo motor and valve device, and leverage mechanism connecting the valve device and governor.

11. In combination, a runner having blades movable into different angular positions, gates movable into different angular positions and controlling the flow of the driving fluid to the runner, a governor having an operating member and a shaft rotated thereby, the shaft of said governor being operatively connected with the gates whereby movements of said operating member are transmitted to adjust the angular positions of the gates, fluid pressure operated mechanism for actuating the runner blades, a valve device for controlling fluid supplied to said mechanism, said valve device having a series of ports and a piston controlling communication through said ports, means for actuating said piston, a cam operatively connected with said governor shaft for operating said piston actuating means, and means operatively connected with said runner blade actuating mechanism for also operating said piston actuating means.

12. In combination, a runner having blades movable into different angular positions, gates movable into different angular positions and controlling the flow of the driving fluid to the runner, a governor having an operating member and a shaft rotated thereby, the shaft of said governor being operatively connected with the gates whereby movements of said operating member are transmitted to adjust the positions of the gates, fluid pressure operated mechanism for actuating the runner blades, a valve device for controlling fluid supplied to said mechanism, said valve device having a series of ports and a piston controlling communication through said ports, a floating lever for actuating said piston, a cam operatively connected with said governor shaft for operating said floating lever and means operatively connected with said runner blade actuating mechanism for also operating said floating lever.

13. In combination, a runner having blades movable into different angular positions, gates movable into different angular positions and controlling the flow of the driving fluid to the runner, a governor having an operating member and a shaft operated by said member, the shaft of said governor being operatively connected with the gates whereby movements of said operating member are transmitted to adjust the positions of the gates, fluid pressure operated mechanism for actuating the runner blades, a valve device for controlling fluid supplied to said mechanism, a floating lever for actuating said valve device, a cam operatively connected with said governor shaft for operating said floating lever with said runner blade actuating mechanism whereby movements of said mechanism will also operate said valve device.

14. In combination, a runner having blades movable into different angular positions, gates movable into different angular positions and controlling the flow of the driving fluid to the runner, a governor having an operating member and a shaft rotated thereby, the shaft of said governor being operatively connected with the gates whereby movements of said operating member are transmitted to adjust the positions of the gates, mechanism operative to move the runner blades in either direction, a fluid pressure operated reciprocatory member for operating said mechanism, a valve device for controlling the fluid supplied to said reciprocatory member, a floating lever for operating said valve device, a cam operatively associated with the floating lever, means connecting the cam with the governor shaft, a rod operatively connected with said reciprocatory member and movable therewith, and means operatively connecting the floating lever with said reciprocatory rod.

DANIEL J. McCORMACK.